US009873125B1

United States Patent
LaGuardia, Jr.

(10) Patent No.: US 9,873,125 B1
(45) Date of Patent: Jan. 23, 2018

(54) CIGAR CUTTER AND SMOKABLE SUBSTANCE GRINDER

(71) Applicant: Michael George LaGuardia, Jr., Los Angeles, CA (US)

(72) Inventor: Michael George LaGuardia, Jr., Los Angeles, CA (US)

( * ) Notice: Subject to any disclaimer, the term of this patent is extended or adjusted under 35 U.S.C. 154(b) by 163 days.

(21) Appl. No.: 14/732,725

(22) Filed: Jun. 6, 2015

Related U.S. Application Data (60) Provisional application No. 62/008,510, filed on Jun. 6, 2014.

(51) Int. Cl.
*B02C 18/00* (2006.01)
*B02C 18/08* (2006.01)
*A24F 13/24* (2006.01)
*B02C 18/18* (2006.01)
*A47J 42/34* (2006.01)
*A47J 42/24* (2006.01)
*A24F 13/00* (2006.01)

(52) U.S. Cl.
CPC .............. *B02C 18/08* (2013.01); *A24F 13/00* (2013.01); *A24F 13/24* (2013.01); *A47J 42/24* (2013.01); *A47J 42/34* (2013.01); *B02C 18/18* (2013.01)

(58) Field of Classification Search
CPC ........... A47J 42/34; A24F 13/24; B02C 18/18
USPC ....................................................... 241/169.1
See application file for complete search history.

(56) References Cited

U.S. PATENT DOCUMENTS

| 5,676,316 A | * | 10/1997 | Hanna ................. A24F 19/0042 241/100 |
| 5,738,117 A | * | 4/1998 | Fontaine, Jr. ............. F23Q 2/32 131/249 |
| 7,422,170 B2 | * | 9/2008 | Bao ........................ B02C 18/24 241/168 |
| 7,503,329 B2 | * | 3/2009 | Lenart .................... A24F 13/24 131/254 |
| 8,393,563 B2 | * | 3/2013 | Chaoui .................. B02C 18/08 241/168 |
| 8,733,679 B2 | * | 5/2014 | Camitta ................. B02C 18/16 241/169.1 |
| D747,037 S | * | 1/2016 | Spielman .............. B02C 18/144 D27/194 |
| 9,332,879 B1 | * | 5/2016 | Bronson ................ A61M 15/06 |
| 9,427,020 B2 | * | 8/2016 | Ruzycky .................. A24C 5/02 |
| 2004/0031154 A1 | * | 2/2004 | Lenart .................... A24F 13/24 30/110 |
| 2008/0191073 A1 | * | 8/2008 | Bao ........................ B02C 18/24 241/101.2 |
| 2009/0165807 A1 | * | 7/2009 | Doroff .................... A24F 13/20 131/248 |
| 2011/0067713 A1 | * | 3/2011 | Egued .................... A24F 25/02 131/250 |

(Continued)

*Primary Examiner* — Faye Francis
(74) *Attorney, Agent, or Firm* — Michael D. Eisenberg (57) ABSTRACT

A cigar cutter and smokable substance grinder has a lid section having grinding surface features. A bottom section is connected to the lid section and has grinding surface features and a blade. A passageway penetrates the entire cutter and grinder and is aligned with both sections such that the sections can be rotated around the passageway without obstructing it. The lid section and bottom section combine to form an interior cavity within the cutter and grinder, for grinding a smokable substance.

13 Claims, 6 Drawing Sheets

(56) References Cited

U.S. PATENT DOCUMENTS

| | | | |
|---|---|---|---|
| 2012/0247493 A1* | 10/2012 | Jones | A24F 13/24 131/328 |
| 2013/0214068 A1* | 8/2013 | Camitta | B02C 18/16 241/25 |
| 2014/0353412 A1* | 12/2014 | Grumbacher | A24C 5/40 241/70 |
| 2015/0298135 A1* | 10/2015 | Spielman | B02C 18/144 241/101.01 |
| 2016/0029691 A1* | 2/2016 | Ruzycky | B02C 18/144 241/24.1 |
| 2016/0128513 A1* | 5/2016 | Chan | A47J 42/34 241/28 |

\* cited by examiner

CIGAR CUTTER AND SMOKABLE SUBSTANCE GRINDER

CROSS-REFERENCES TO RELATED APPLICATIONS

The present application claims priority from U.S. Provisional Application Ser. No. 62/008,510 filed on Jun. 6, 2014, which is hereby incorporated herein by reference in its entirety.

TECHNICAL FIELD

The present invention, in some embodiments thereof, relates to devices for aiding in smoking.

BACKGROUND OF THE INVENTION

During the leisure activity of smoking, the user may desire to open up a cigar and place a smokable substance, such as tobacco, inside. It would be convenient to have a tool or device that can both safely and efficiently cut open a cigar and grind up the smokable substance to put into the cigar. The present invention addresses this need.

BRIEF SUMMARY OF EMBODIMENTS OF THE INVENTION (1) The present invention relates to a cigar cutter and smokable substance grinder. In a variant, the cutter and grinder, comprises: a lid section comprising grinding surface features; a bottom section connected to the lid section, comprising grinding surface features and a blade. An alignment mechanism is located on both the lid section and the bottom section for interfacing with one another to align the sections together in a constant axial spatial relationship.

(2) In another variant, the lid section comprises a side wall and a ceiling which anchors grinding surface features of the lid section and the ceiling faces grinding surface features of the bottom section.

(3) In a further variant, the alignment mechanism comprises a cylinder on the lid section and a cylinder on the bottom section.

(4) In still another variant, the grinding surface features of both sections comprise spikes.

(5) In yet a further variant of the cutter and grinder, the cylinders of both sections are configured with one cylinder sized to receive the other cylinder and permit rotation, while the fit prevents displacement of the two sections in a direction radial to an axis of the cylinders.

(6) In a variant, the cutter and grinder has openings on the lid and bottom section that leads to a passageway penetrating the entire cutter and grinder, and is aligned with the axis of the cylinders of both sections.

(7) In another variant, a cutting edge of the blade extends into an interior of the passageway.

(8) In a further variant, the cutter and grinder comprises a slot in an interior member of the bottom section. The slot is dimensioned to hold the blade in fixed position, and wherein the blade is positioned inside the slot.

(9) In yet another variant, the blade comprises: a surface containing the cutting edge disposed inside the slot in the interior member of the bottom section; and a surface turned at an angle to the surface containing the cutting edge. The surface is turned at an angle abuts the cylinder and prevents the blade from extending into the passageway beyond a predetermined point.

(10) In still a further variant, the lid section and bottom section combine to form an interior cavity within the cutter and grinder, for grinding a smokable substance.

(11) In a variant, the cutter and grinder has a bottom cover connected to and sealing a side of the bottom section, opposite a side of the bottom section facing the lid section. The bottom cover has an opening that leads to the passageway and encloses the side. The bottom cover prevents removal of the blade.

(12) In another variant, a cigar cutter and smokable substance grinder comprises: a lid section comprising grinding surface features; a bottom section connected to the lid section, comprising: grinding surface features; a blade. A passageway penetrates the entire cutter and grinder, and is aligned with both sections such that the sections can be rotated around the passageway without obstructing it. The lid section and bottom section combine to form an interior cavity within the cutter and grinder, for grinding a smokable substance.

(13) In a further variant of the cutter and grinder, an alignment mechanism resides on both the lid section and the bottom section for interfacing with one another to align the sections together in a constant coaxial spatial relationship.

(14) In yet another variant, the alignment mechanism comprises a cylinder on the lid section and a cylinder on the bottom section.

(15) In still a further variant, the lid section comprises a side wall and a ceiling which anchors grinding surface features of the lid section and the ceiling faces grinding surface features of the bottom section. The grinding surface features of both sections comprise spikes. The cylinders of both sections are configured with one cylinder sized to receive the other cylinder and permit rotation, while the fit prevents displacement of the two sections in a direction radial to an axis of the cylinders. The cutter and grinder comprises openings on the lid and bottom section that leads to a passageway penetrating the entire cutter and grinder, and is aligned with the axis of the cylinders of both sections.

(16) In a variant, a cutting edge of the blade extends into an interior of the passageway.

(17) In another variant, a cigar cutter and smokable substance grinder comprises: a lid section comprising spikes; a bottom section connected to the lid section, comprising: spikes; a blade. An alignment mechanism is housed on both the lid section and the bottom section for interfacing with one another to align the sections together in a constant coaxial spatial relationship. The alignment mechanism comprises a cylinder on the lid section and a cylinder on the bottom section. The cylinders of both sections are configured with one cylinder sized to receive the other cylinder and permit rotation, while the fit prevents displacement of the two sections in a direction radial to an axis of the cylinders. A passageway penetrates the entire cutter and grinder, and is aligned with both sections such that the sections can be rotated around the passageway without obstructing it. The lid section comprises a side wall and a ceiling which anchors spikes of the lid section and the ceiling faces the spikes of the bottom section. The lid section and bottom section combine to form an interior cavity within the cutter and grinder, for grinding a smokable substance. The cutter and grinder comprises openings on the lid and bottom section that leads to a passageway penetrating the entire cutter and grinder, and is aligned with the axis of the cylinders of both sections. A slot is disposed in interior member of the bottom section. The slot is dimensioned to hold the blade in fixed position, and the blade is positioned inside the slot and a cutting edge of the blade extends into an interior of the passageway. The blade comprises: a surface containing the cutting edge disposed inside the slot in the cylinder of the bottom section; and a surface turned at an angle to the surface containing the cutting edge. The surface turned at an angle abuts the cylinder and prevents the blade from extending into the passageway beyond a predetermined point.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
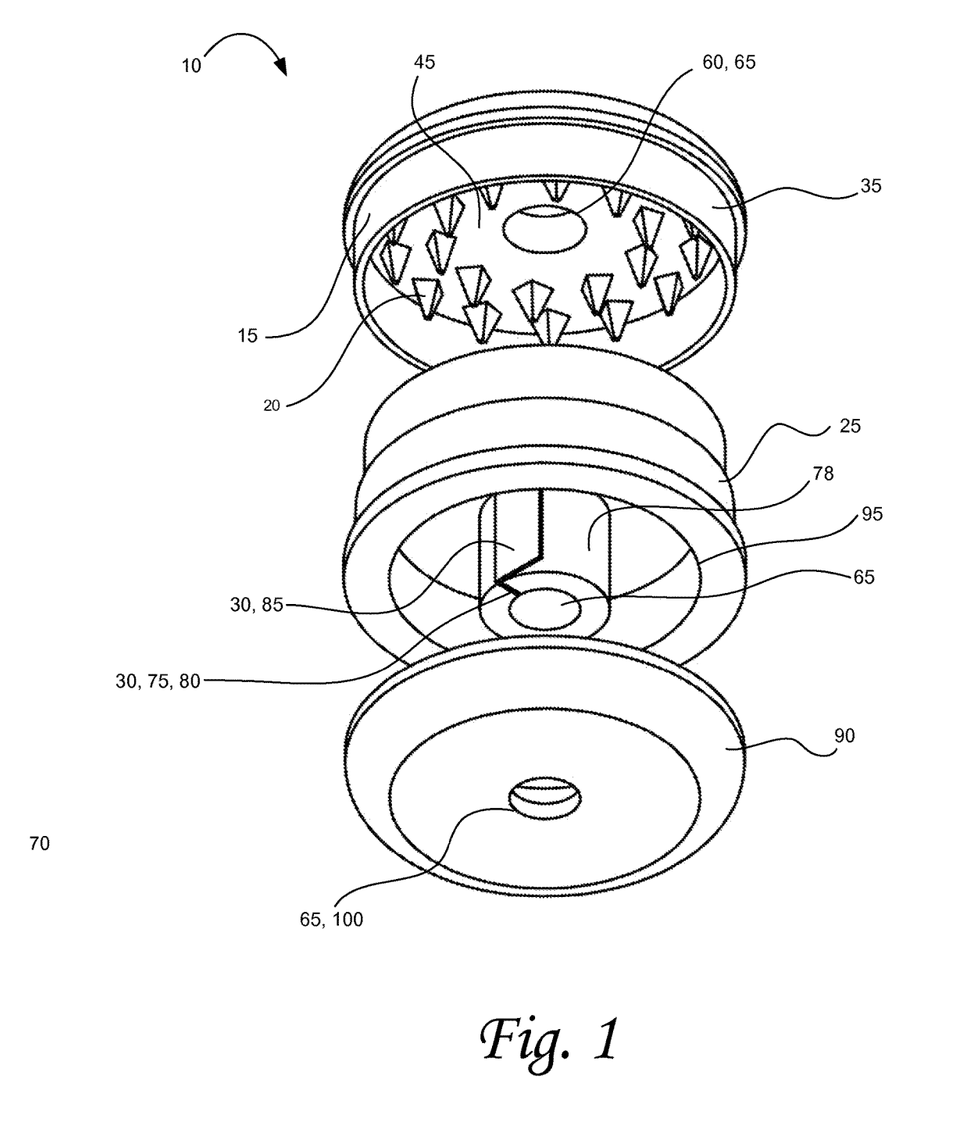
FIG. 1 is an exploded perspective view of the cigar cutter and smokable substance grinder angled from above.
Figure 2:
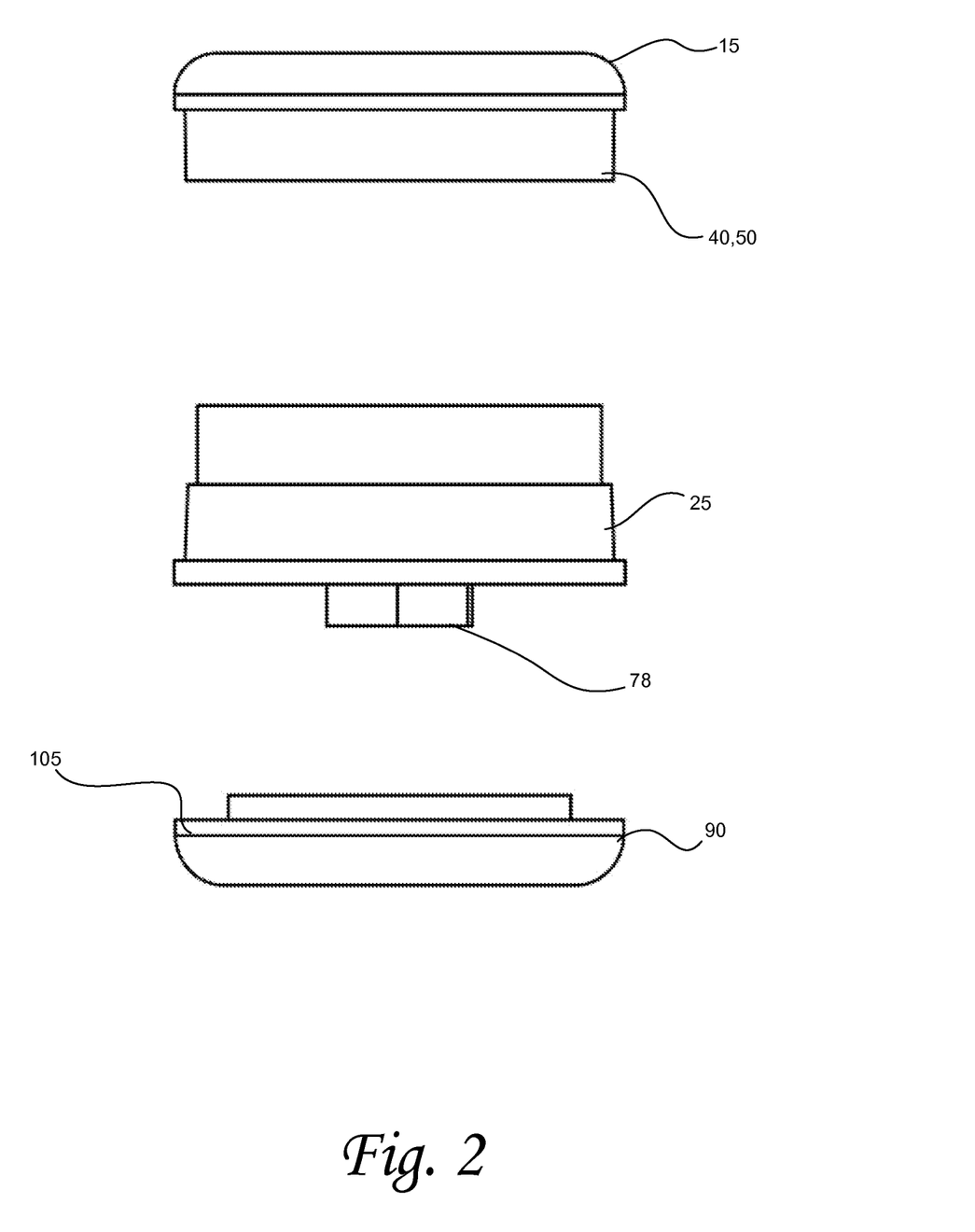
FIG. 2 is an exploded side view of the cutter and grinder.
Figure 3:
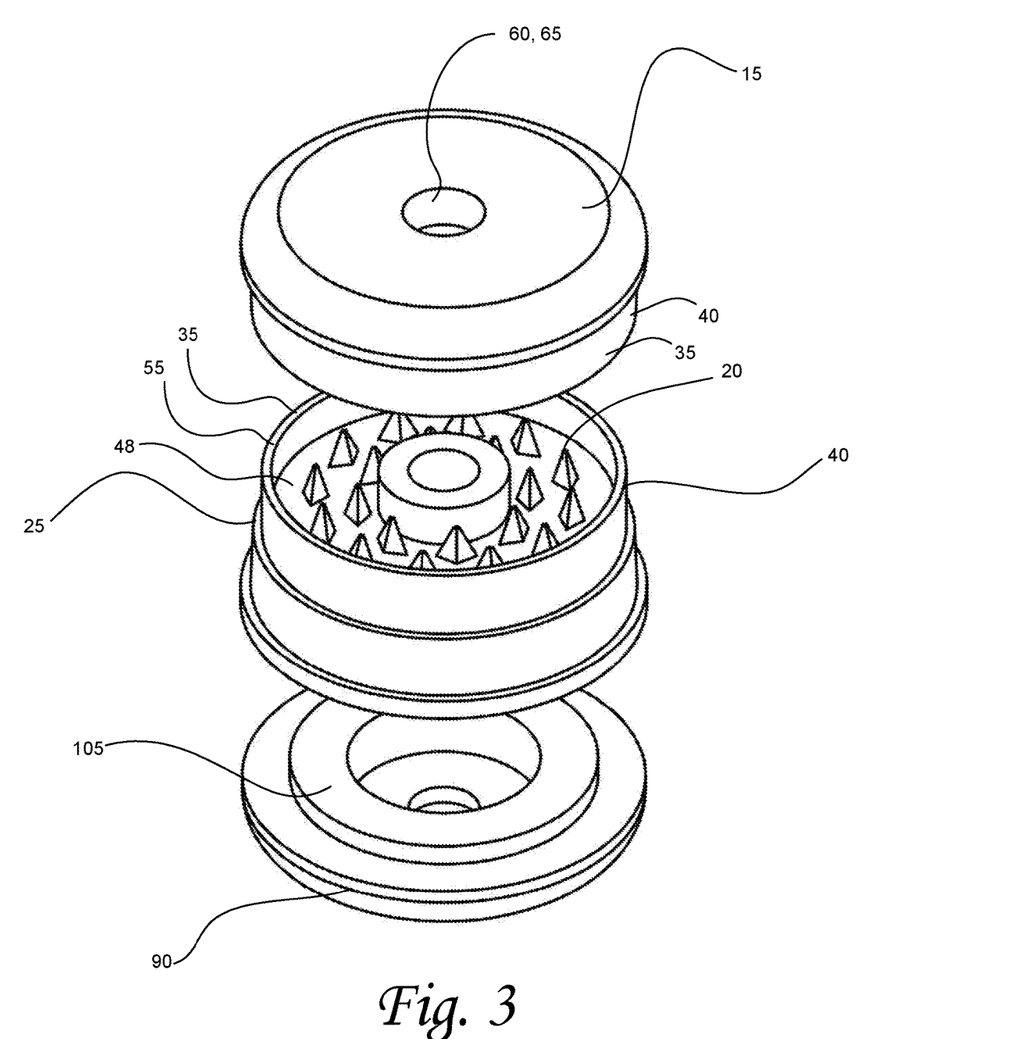
FIG. 3 is an exploded perspective view of the cigar cutter and smokable substance grinder angled from below.
Figure 4:
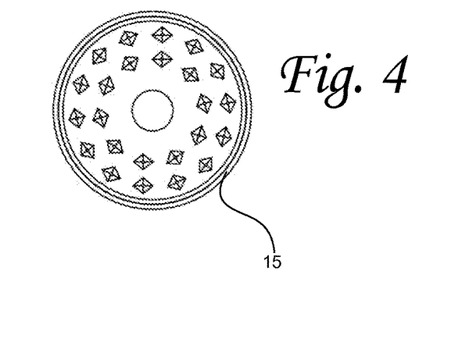
FIG. 4 is a bottom view of the lid section with the ceiling and spikes on the ceiling visible.
Figure 5:
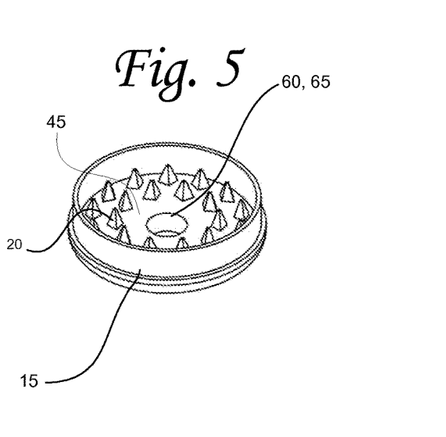
FIG. 5 is a perspective view of the lid section with the ceiling and spikes on the ceiling visible.
Figure 6:
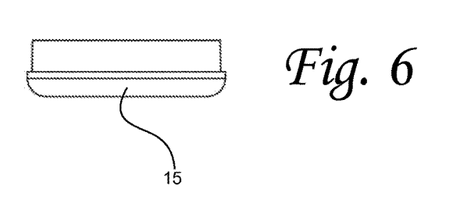
FIG. 6 is a side view of the lid section.
Figure 7:
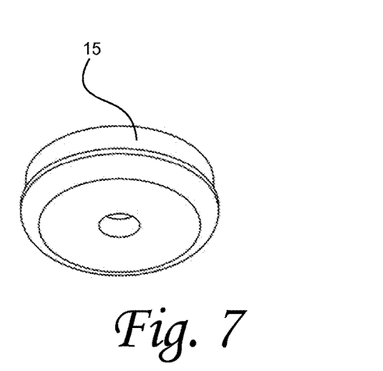
FIG. 7 is a perspective view of the lid section.
Figure 8:
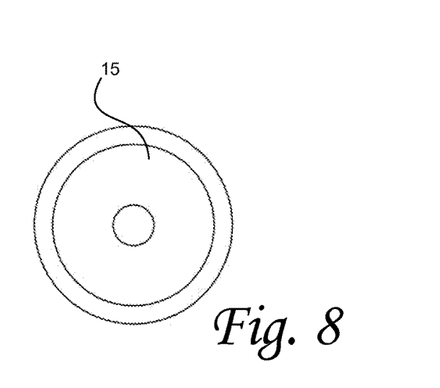
FIG. 8 is a top view of the lid section.
Figures 9, 10, 11, 12, 13:
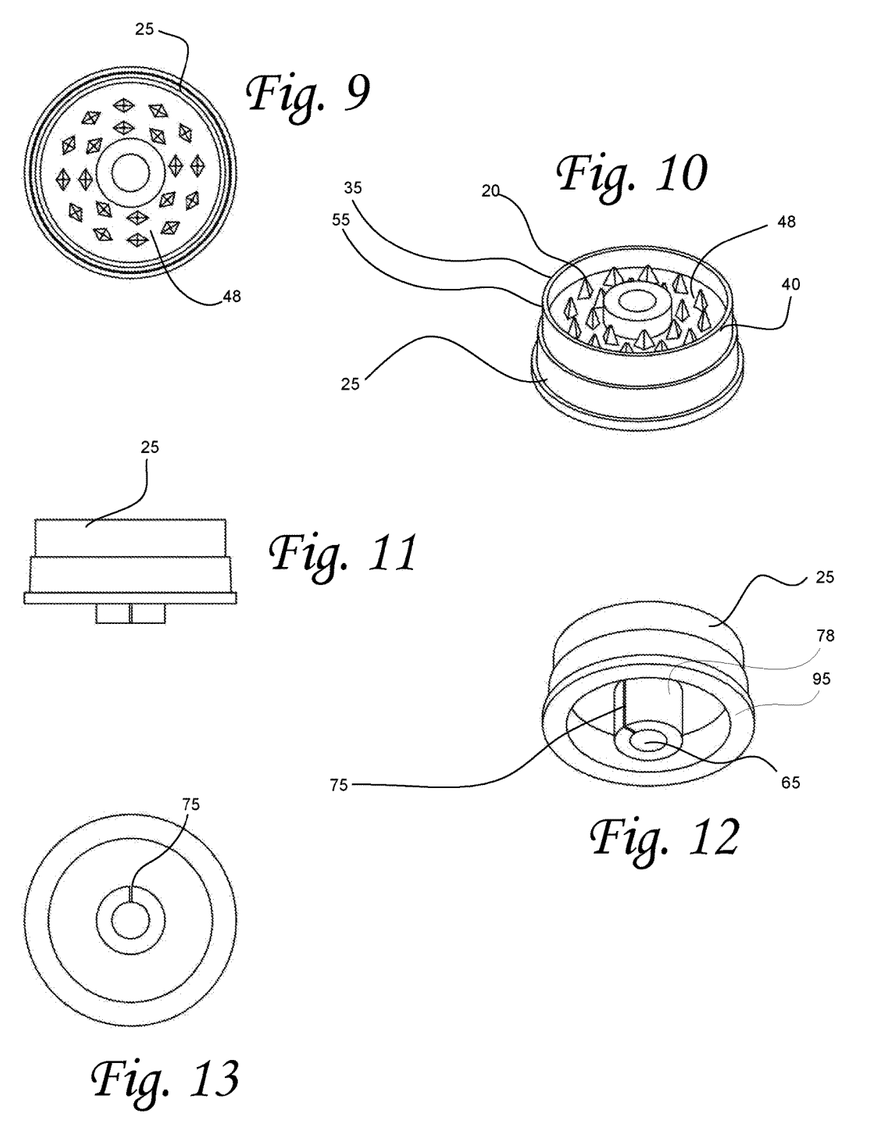
FIG. 9 is a top view with the floor of the bottom section visible of the cutter and grinder.
FIG. 10 is a perspective view of the bottom section of the cutter and grinder with the floor and spikes on the floor visible.
FIG. 11 is a side view of the bottom section visible of the cutter and grinder.
FIG. 12 is a perspective view of the bottom section with the bottom side and interior member visible.
FIG. 13 is a bottom view of the bottom section with the bottom side and interior member visible.
Figure 14:
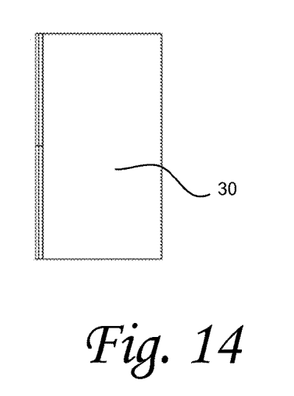
FIG. 14 is a side view of the blade of the cutter and grinder.
Figure 15:
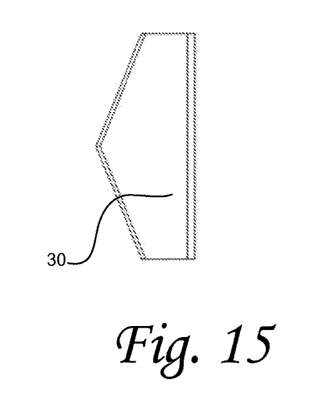
FIG. 15 is a front view of the blade of the cutter and grinder.
Figure 16:
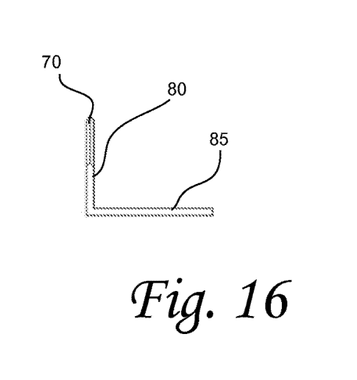
FIG. 16 is a top view of the blade of the cutter and grinder.
Figure 17:
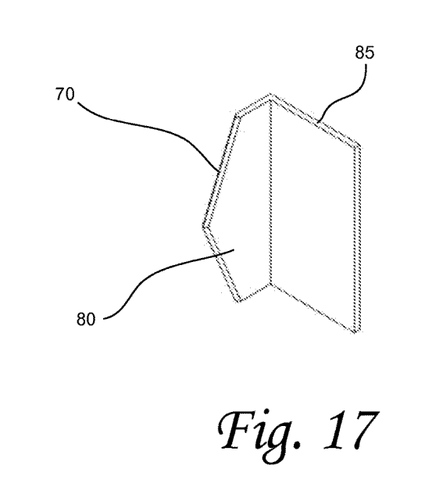
FIG. 17 is a perspective view of the blade of the cutter and grinder.

The following reference numerals are used throughout this document:

10 cigar cutter and smokable substance grinder
    15 lid section
    20 grinding surface features
    20 spikes
    25 bottom section
    30 blade
    35 alignment mechanism
    40 side wall
    45 ceiling
    48 floor
    50 cylinder on lid section
    55 cylinder on bottom section
    60 openings
    65 passageway
    70 cutting edge
    75 slot
    78 interior member of the bottom section
    80 surface containing the cutting edge
    85 surface turned at an angle
    90 bottom cover
    95 bottom side of the bottom section
    98 side of the bottom section facing the lid section
    100 opening on bottom cover that leads to the passageway
    105 raised ring of the bottom lid The present invention, in some embodiments thereof, relates to a cigar cutter and smokable substance grinder 10. In a variant, referring to FIGS. 1-17, the cutter and grinder 10 comprises a lid section 15 comprising grinding surface features 20. A bottom section 25 is connected to the lid section 15 and has grinding surface features 20 and a blade 30. An alignment mechanism 35 is located on both the lid section 15 and the bottom section 25 for interfacing with one another to align the sections 15, 25 together in a constant coaxial spatial relationship (both sections centered on the same axis).

In another variant, the lid section comprises a side wall 40 and a ceiling 45 which anchors grinding surface features 20 of the lid section and the ceiling faces grinding surface features of the bottom section. The bottom section has a side wall 40 and a floor 48 with grinding surface features attached. Optionally, the grinding surface features 20 of both sections are spikes 20.

In a further variant, the alignment mechanism 35 comprises a cylinder 50 on the lid section and a cylinder 55 on the bottom section. Optionally, the cylinders of both sections are configured with one cylinder sized to receive the other cylinder and permit rotation, while the fit prevents displacement of the two sections in a direction radial to an axis of the cylinders. Optionally, a passageway 65 passes through the cylinders 50, 55. Optionally, a part of the bottom section extends above the side wall 40 of the bottom section.

In a variant, the cutter and grinder has openings 60 on the lid 15 and bottom 25 section that leads to a passageway 65 penetrating the entire cutter and grinder, and is aligned with the axis of the cylinders of both sections.

In another variant, a cutting edge 70 of the blade 30 extends into an interior of the passageway 65. Optionally, a slot 75 in an interior member 78 of the bottom section is dimensioned to hold the blade 30 in fixed position inside the slot 75. Optionally, the blade has a surface 80 containing the cutting edge 70 disposed inside the slot 75 in the interior member 78 of the bottom section 25, and optionally has a surface 85 turned at an angle to the surface 80 containing the cutting edge 70. The surface 85 turned at an angle abuts the cylinder 55 and prevents the blade 30 from extending into the passageway 65 beyond a predetermined point. The interior member 78 of the bottom section 25 extends below the bottom section 25 toward a bottom side 95 of the bottom section 25 and is connected to the center of the bottom section 25 and is coaxial with the passageway and the cylinders.

In still a further variant, the lid section 15 and bottom section 25 combine to form an interior cavity within the cutter and grinder, for grinding a smokable substance.

In another variant, the cutter and grinder 10, has a bottom cover 90 connected to and sealing a bottom side 95 of the bottom section, opposite a side 98 of the bottom section facing the lid section 15. The bottom cover 25 has an opening 100 that leads to the passageway 65 and encloses the bottom side 95, preventing contact or removal of the blade. Optionally, the bottom cover 90 has a raised ring 105 that fits snuggly into the bottom side 95 by matching the exterior contour of the ring 105.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A cigar cutter and smokable substance grinder, comprising:
   a lid section comprising grinding surface features;
   a bottom section connected to the lid section, comprising:
      grinding surface features;
      a blade; and
   an alignment mechanism on both the lid section and the bottom section for interfacing with one another to align the sections together in a constant axial spatial relationship;
   wherein the lid section comprises a side wall and a ceiling which anchors the grinding surface features of the lid section and the ceiling faces the grinding surface features of the bottom section;
   wherein the alignment mechanism comprises a cylinder on the lid section and a cylinder on the bottom section;
   wherein the cylinders of both sections are configured so that each cylinder is sized to receive the other cylinder and permit rotation when the cylinders attach to one another, while the attached cylinders prevents displacement of the two sections in a direction radial to an axis of the cylinders; and
   an opening on the lid section and the bottom section that leads to a passageway penetrating the cigar cutter and smokable substance grinder centrally through an axis of the cylinders of both sections.

2. The cutter and grinder of claim 1, wherein the grinding surface features of both sections comprise spikes.

3. The cutter and grinder of claim 1, wherein a cutting edge of the blade extends into an interior of the passageway.

4. The cutter and grinder of claim 3, wherein spikes are disposed on a floor of the bottom section;
   wherein the cutter and grinder further comprise a slot in an interior member of the bottom section, extending below a floor and configured to hold the blade in a fixed position, and wherein the blade is inside the slot.

5. The cutter and grinder of claim 4, wherein the blade comprises:
   a surface containing a cutting edge disposed inside the interior member of the bottom section; and
   a surface turned at an angle to the surface containing the cutting edge;
   wherein the surface turned at an angle abuts a cylinder and prevents the blade from extending into the passageway beyond a predetermined point.

6. The cutter and grinder of claim 5, wherein the lid section and bottom section combine to form an interior cavity within the cutter and grinder, for grinding a smokable sub stance.

7. The cutter and grinder of claim 6, further comprising a bottom cover connected to and sealing a side of the bottom section;
   wherein the bottom cover opposes a side of the bottom section that faces the lid section;
   wherein the bottom cover comprises an opening that leads to the passageway and encloses a side of the bottom section; and
   wherein the bottom cover prevents removal of the blade.

8. A cigar cutter and smokable substance grinder, comprising:
   a lid section comprising grinding surface features;
   a bottom section connected to the lid section, comprising:
      grinding surface features;
      a blade; and
      a passageway penetrating the cigar cutter and smokable substance grinder centrally through both sections such that the sections can be rotated around the passageway without obstructing the passageway; and
   wherein the lid section and bottom section combine to form an interior cavity within the cigar cutter and smokable substance grinder, for grinding a smokable sub stance.

9. The cutter and grinder of claim 8, further comprising an alignment mechanism on both the lid section and the bottom section for interfacing with one another to align the sections together in a constant coaxial spatial relationship.

10. The cutter and grinder of claim 9, wherein the alignment mechanism comprises a cylinder on the lid section and a cylinder on the bottom section.

11. The cutter and grinder of claim 10, wherein:
   the lid section comprises a side wall and a ceiling which anchors grinding surface features of the lid section and the ceiling faces grinding surface features of the bottom section;
   grinding surface features of both sections comprise spikes;
   the cylinders of both lid and bottom sections are configured so that each cylinder is sized to receive the other cylinder and permit rotation when the cylinders attach to one another, while the attached cylinders prevent displacement of the two sections in a direction radial to an axis of the cylinders; and
   the cigar cutter and smokable substance grinder comprises an opening on the lid section and bottom section that leads to a passageway penetrating the cigar cutter and smokable substance grinder centrally through an axis of the cylinders of both sections.

12. The cutter and grinder of claim 11, wherein a cutting edge of the blade extends into an interior of the passageway.

13. A cigar cutter and smokable substance grinder, comprising:
   a lid section comprising spikes;
   a bottom section connected to the lid section, comprising:
      spikes;
      a blade; and
   an alignment mechanism on both the lid section and the bottom section for interfacing with one another to align the sections together in a constant coaxial spatial relationship, the alignment mechanism comprising a cylinder on the lid section and a cylinder on the bottom section, wherein each cylinder is configured so that each cylinder is sized to receive the other cylinder and permit rotation when the cylinders attach to one another, while the attached cylinders prevent displacement of the two sections in a direction radial to an axis of the cylinders;
   a passageway penetrating the cigar cutter and smokable substance grinder centrally through both sections such that the sections can be rotated around the passageway without obstructing the passageway;
   wherein the lid section comprises a side wall and a ceiling which anchors spikes of the lid section and the ceiling faces the spikes of the bottom section;

wherein the lid section and bottom section combine to form an interior cavity within the cigar cutter and smokable substance grinder, for grinding a smokable substance;

the cigar cutter and smokable substance grinder comprises an opening on the lid section and bottom section that leads to a passageway penetrating the cigar cutter and smokable substance grinder directly through an axis of the cylinders of both sections;

wherein a slot is disposed in an interior member of the bottom section, the slot is configured to hold the blade in a fixed position, and wherein the blade is inside the slot and a cutting edge of the blade extends into an interior of the passageway;

wherein the blade comprises:
- a surface containing the cutting edge disposed inside the slot in the interior member of the bottom section; and
- a surface turned at an angle to the surface containing the cutting edge;
- wherein the surface turned at an angle abuts the cylinder and prevents the blade from extending into the passageway beyond a predetermined point.

* * * * *